United States Patent
Bennett et al.

(10) Patent No.: US 10,002,012 B2
(45) Date of Patent: *Jun. 19, 2018

(54) VIRTUALIZATION EVENT PROCESSING IN A LAYERED VIRTUALIZATION ARCHITECTURE

(71) Applicant: Intel Corporation, Santa Clara, CA (US)

(72) Inventors: Steven M. Bennett, Hillsboro, OR (US); Andrew V. Anderson, Hillsboro, OR (US); Gilbert Neiger, Portland, OR (US); Dion Rodgers, Hillsboro, OR (US); Richard A. Uhlig, Hillsboro, OR (US); Lawrence O. Smith, Beaverton, OR (US); Barry E. Huntley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/226,864

(22) Filed: Aug. 2, 2016

(65) Prior Publication Data

US 2017/0052832 A1    Feb. 23, 2017

Related U.S. Application Data

(63) Continuation of application No. 13/595,838, filed on Aug. 27, 2012, now Pat. No. 9,405,565, which is a
(Continued)

(51) Int. Cl.
*G06F 9/455* (2018.01)
*G06F 9/54* (2006.01)
(Continued)

(52) U.S. Cl.
CPC ........ *G06F 9/45533* (2013.01); *G06F 9/3861* (2013.01); *G06F 9/4555* (2013.01);
(Continued)

(58) Field of Classification Search
None
See application file for complete search history.

(56) References Cited

U.S. PATENT DOCUMENTS

| 4,253,145 A | 2/1981 | Goldberg |
| 7,191,440 B2 | 3/2007 | Cota-Robles et al. |

(Continued)

FOREIGN PATENT DOCUMENTS

| JP | 2002041305 A | 2/2002 |
| JP | 2007505402 A | 3/2007 |

(Continued)

OTHER PUBLICATIONS

Abandonment from U.S. Appl. No. 11/191,827 dated Aug. 25, 2010, 1 page.
(Continued)

*Primary Examiner* — Qing Yuan Wu
(74) *Attorney, Agent, or Firm* — Nicholson De Vos Webster & Elliott LLP

(57) ABSTRACT

Embodiments of apparatuses and methods for processing virtualization events in a layered virtualization architecture are disclosed. In one embodiment, an apparatus includes a hardware processor including event circuit to recognize a virtualization event, and evaluation circuit to determine whether to transfer control of the apparatus from a child guest to a parent guest in response to the virtualization event, wherein the child guest and the parent guest each include a bit per virtualization event to indicate whether the parent guest is to gain control when the virtualization event occurs.

8 Claims, 4 Drawing Sheets

Related U.S. Application Data continuation of application No. 12/858,461, filed on Aug. 18, 2010, now Pat. No. 8,271,978, and a continuation of application No. 11/191,827, filed on Jul. 27, 2005, now Pat. No. 9,785,485.

(51) Int. Cl.
　　*G06F 9/48*　　　(2006.01)
　　*G06F 9/38*　　　(2018.01)
　　*G06F 13/24*　　(2006.01)

(52) U.S. Cl.
　　CPC ...... *G06F 9/45545* (2013.01); *G06F 9/45558* (2013.01); *G06F 9/4812* (2013.01); *G06F 9/542* (2013.01); *G06F 13/24* (2013.01); *G06F 2009/45566* (2013.01)

(56) References Cited

U.S. PATENT DOCUMENTS

| | | |
|---|---|---|
| 2002/0082824 A1 | 6/2002 | Neiger et al. |
| 2003/0037089 A1 | 2/2003 | Cota-Robles et al. |
| 2004/0003324 A1 | 1/2004 | Uhlig et al. |
| 2005/0071840 A1 | 3/2005 | Neiger et al. |
| 2005/0080965 A1 | 4/2005 | Bennett et al. |
| 2005/0081199 A1 | 4/2005 | Traut |
| 2006/0206892 A1 | 9/2006 | Vega et al. |

FOREIGN PATENT DOCUMENTS

| | | |
|---|---|---|
| NO | 2004061645 A2 | 7/2004 |
| TW | 502162 B | 9/2002 |
| TW | 200403586 A | 3/2004 |
| TW | I252427 B | 4/2006 |
| WO | 2005029326 A1 | 3/2005 |
| WO | 2005033937 A1 | 4/2005 |

OTHER PUBLICATIONS

Advisory Action from U.S. Appl. No. 13/837,737 dated Jul. 30, 2014, 2 pages.
Final Office Action from U.S. Appl. No. 11/191,827 dated May 12, 2009, 10 pages.
Final Office Action from U.S. Appl. No. 12/858,461 dated Jan. 6, 2012, 14 pages.
Final Office Action from U.S. Appl. No. 13/590,001 dated Feb. 4, 2014, 8 pages.
Final Office Action from U.S. Appl. No. 13/595,838 dated Jan. 26, 2015, 13 pages.
Final Office Action from U.S. Appl. No. 13/595,838 dated Oct. 14, 2015, 9 pages.
Final Office Action from U.S. Appl. No. 13/837,526 dated Oct. 2, 2013, 16 pages.
Final Office Action from U.S. Appl. No. 13/837,526 dated Oct. 27, 2014, 7 pages.
Final Office Action from U.S. Appl. No. 13/837,737 dated Apr. 24, 2014, 6 pages.
Final Office Action from U.S. Appl. No. 13/837,737 dated Oct. 2, 2013, 16 pages.
Goldberg R., "Survey of Virtual Machine Research," IEEE Computer, vol. 7, No. 6, Jun. 1974, pp. 34-45.
Non-Final Office Action from U.S. Appl. No. 11/191,827 dated Aug. 25, 2008, 12 pages.
Non-Final Office Action from U.S. Appl. No. 11/191,827 dated Aug. 28, 2009, 12 pages.
Non-Final Office Action from U.S. Appl. No. 13/590,001 dated Oct. 31, 2013, 20 pages.
Non-Final Office Action from U.S. Appl. No. 13/595,838 dated Jun. 17, 2015, 14 pages.
Non-Final Office Action from U.S. Appl. No. 13/837,526 dated Feb. 17, 2015, 6 pages.
Non-Final Office Action from U.S. Appl. No. 13/837,526 dated Jan. 29, 2014, 8 pages.
Non-Final Office Action from U.S. Appl. No. 13/837,737 dated Jan. 14, 2014, 8 pages.
Notice of Allowance from U.S. Appl. No. 11/191,827 dated May 10, 2010, 12 pages.
Notice of Allowance from U.S. Appl. No. 12/858,461 dated May 18, 2012, 9 pages.
Notice of Allowance from U.S. Appl. No. 13/590,001 dated Apr. 15, 2014, 6 pages.
Notice of Allowance from U.S. Appl. No. 13/595,838 dated Apr. 1, 2016, 11 pages.
Notice of Allowance from U.S. Appl. No. 13/595,838 dated Feb. 1, 2016, 5 pages.
Notice of Allowance from U.S. Appl. No. 13/837,526 dated Sep. 8, 2015, 8 pages.
Notice of Allowance from U.S. Appl. No. 13/837,737 dated Oct. 8, 2014, 7 pages.
Office Action received for European Patent Application No. 06253930.9, dated Sep. 5, 2007, 6 pages.
Office Action received for Japanese Patent Application No. 2006-203447, dated Jan. 20, 2009, 6 pages of Japanese Office Action including 3 pages of English translation.
Office Action received for Japanese Patent Application No. 2006-203447, dated Jul. 19, 2011, 21 pages of Japanese Office Action including 6 pages of English translation.
Office Action received for Japanese Patent Divisional Appln No. 2012-219381, dated Sep. 10, 2013, 3 pages of Japanese Office Action and 3 pages of translation.
Office Action received for Japanese Patent Divisional Application No. 2010-047518, dated Jul. 3, 2012, 4 pages of Japanese Office Action including 2 pages of English translation.
Office Action received for Japanese Patent Divisional Application No. 2011-263341, dated Apr. 23, 2013, 6 pages of Japanese Office Action including 3 pages of English translation.
Office Action received for Taiwan Patent Application No. 95124380, dated Apr. 19, 2010, 12 pages of Taiwan Office Action including 6 pages of English translation.

VIRTUALIZATION EVENT PROCESSING IN A LAYERED VIRTUALIZATION ARCHITECTURE

CROSS-REFERENCE TO RELATED APPLICATION

This application is a continuation of U.S. patent application Ser. No. 13/595,838, filed Aug. 27, 2012, now U.S. Pat. No. 9,405,565, which is a continuation of U.S. patent application Ser. No. 12/858,461, filed Aug. 18, 2010, now U.S. Pat. No. 8,271,978, which is a continuation of U.S. patent application Ser. No. 11/191,827, which was filed on Jul. 27, 2005.

BACKGROUND

1. Field

The present disclosure pertains to the field of data processing, and more particularly, to the field of virtualizing resources in data processing apparatuses.

2. Description of Related Art

Generally, the concept of virtualization of resources in data processing apparatuses allows multiple instances of one or more operating systems (each, an "OS") to run on a single data processing apparatus, even though each OS is designed to have complete, direct control over the apparatus and its resources. Virtualization is typically implemented by using software (e.g., a virtual machine monitor, or a "VMM") to present to each OS a "virtual machine" (a "VM") having virtual resources that the OS may completely and directly control, while the VMM maintains a system environment for implementing virtualization policies such as sharing and/or allocating the physical resources among the VMs (the "virtualization environment"). Each OS, and any other software, that runs on a VM, unaware of the virtualization environment, is referred to as a "guest" or as "guest software," while a "host" or "host software" is software, such as a VMM, that runs outside of, and may or may not be aware of, the virtualization environment.

A processor in a data processing apparatus may support virtualization, for example, by operating in two modes—a "root" mode in which software runs directly on the hardware, outside of any virtualization environment, and a "non-root" mode in which software runs at its intended privilege level, but within a virtualization environment hosted by a VMM running in root mode. In the virtualization environment, certain events, operations, and situations, such as external interrupts or attempts to access privileged registers or resources, may be "intercepted," i.e., cause the processor to exit the virtualization environment so that the VMM may operate, for example, to implement virtualization policies. The processor may support instructions for establishing, entering, exiting, and maintaining a virtualization environment, and may include register bits or other structures that indicate or control virtualization capabilities of the processor.

BRIEF DESCRIPTION OF THE FIGURES

The present invention is illustrated by way of example and not limitation in the accompanying figures.

DETAILED DESCRIPTION

Embodiments of apparatuses and methods for processing virtualization events in a layered virtualization environment are described. In the following description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Figure 1:
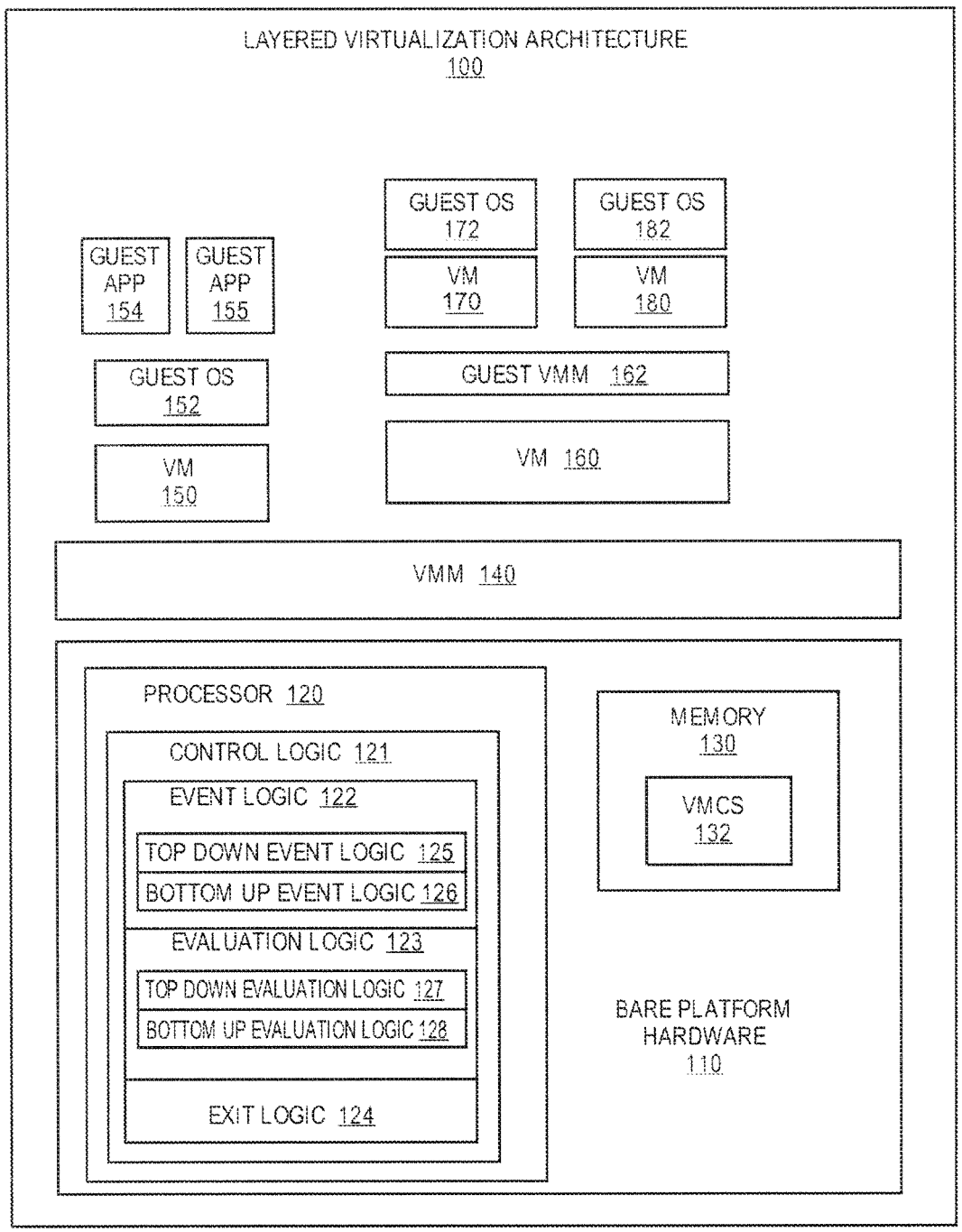
FIG. 1 illustrates a layered virtualization architecture in which an embodiment of the present invention may operate.

FIG. 1 illustrates layered virtualization architecture 100, in which an embodiment of the present invention may operate. In FIG. 1, bare platform hardware 110 may be any data processing apparatus capable of executing any OS or VMM software. For example, bare platform hardware may be that of a personal computer, mainframe computer, portable computer, handheld device, set-top box, or any other computing system.

Bare platform hardware 110 includes processor 120 and memory 130. Processor 120 may be any type of processor, including a general purpose microprocessor, such as a processor in the Pentium® Processor Family, the Itanium® Processor Family, or other processor family from Intel Corporation, or another processor from another company, or a digital signal processor or microcontroller. Although FIG. 1 shows only one such processor 120, bare platform hardware 110 may include any number of processors. Memory 130 may be static or dynamic random access memory, semiconductor-based read only or flash memory, magnetic or optical disk memory, any other type of medium readable by processor 120, or any combination of such mediums. Bare platform hardware 110 may also include any number of input/output or other devices.

In this embodiment, VMM 140 is a "root mode host" because it runs in root mode on processor 120. VMM 140 may be any software, firmware, or hardware host installed to run on, or accessible to, bare platform hardware 110, to present VMs, i.e., abstractions of bare platform hardware 110, to guests, or to otherwise create VMs, manage VMs, and implement virtualization policies within a virtualization environment supported by virtualization architecture 100. In other embodiments, a root mode host may be any monitor, hypervisor, OS, or other software, firmware, or hardware capable of controlling bare platform hardware 110.

A guest may be any OS, any VMM, including another instance of VMM 140, any hypervisor, or any application or other software. Each guest expects to access physical resources, such as processor and platform registers, memory, and input/output devices, of bare platform hardware 110, according to the architecture of the processor and the platform presented in the VM. FIG. 1 shows VMs 150, 160, 170, and 180, with guest OS 152 and guest applications 154 and 155 installed to run on VM 150, guest VMM 162 installed to run on VM 160, guest OS 172 installed to run on VM 170, and guest OS 182 installed to run on VM 180. In this embodiment, all guests run in non-root mode. Although FIG. 1 shows four VMs and six guests, any number of VMs may be created and any number of guests may be installed to run on each VM within the scope of the present invention.

Virtualization architecture 100 is "layered" or "recursive" because it allows one VMM, for example, VMM 140, to host another VMM, for example, VMM 162, as a guest. In layered virtualization architecture 100, VMM 140 is the host of the virtualization environment including VMs 150 and 160, and is not a guest in any virtualization environment because it is installed to run on bare platform hardware 110 with no "intervening" monitor between it and bare platform hardware 110. An "intervening" monitor is a monitor, such as VMM 162, that hosts a guest, such as guest OS 172, but is also a guest itself. VMM 162 is the host of the virtualization environment including VMs 170 and 180, but is also a guest in the virtualization environment hosted by VMM 140. An intervening monitor (e.g., VMM 162) is referred to herein as a parent guest, because it may function as both a parent to another VM (or hierarchy of VMs) and as a guest of an underlying VMM (e.g., VMM 140 is a parent of VMM 162 which is a parent to guests 172 and 182).

A monitor, such as VMM 140, is referred to as the "parent" of a guest, such as OS 152, guest application 154, guest application 155, and guest VMM 162, if there are no intervening monitors between it and the guest. The guest is referred to as the "child" of that monitor. A guest may be both a child and a parent. For example, guest VMM 162 is a child of VMM 140 and the parent of guest OS 172 and guest OS 182.

A resource that can be accessed by a guest may either be classified as a "privileged" or a "non-privileged" resource. For a privileged resource, a host (e.g., VMM 140) facilitates the functionality desired by the guest while retaining ultimate control over the resource. Non-privileged resources do not need to be controlled by the host and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "events" herein. Some of these events are "privileged" because they must be handled by a host to ensure proper operation of VMs, protection of the host from guests, and protection of guests from each other.

At any given time, processor 120 may be executing instructions from VMM 140 or any guest, thus VMM 140 or the guest may be active and running on, or in control of, processor 120. When a privileged event occurs or a guest attempts to access a privileged resource, control may be transferred from the guest to VMM 140. The transfer of control from a guest to a host is referred to as a "VM exit" herein. After handling the event or facilitating the access to the resource appropriately, VMM 140 may return control to a guest. The transfer of control from a host to a guest is referred to as a "VM entry" herein.

In addition to a VM exit transferring control from a guest to a root mode host, as described above, embodiments of the present invention also provide for a VM exit to transfer control from a guest to a non-root mode host, such as an intervening monitor. In embodiments of the present invention, virtualization events (i.e., anything that may cause a VM exit) may be classified as "top-down" or "bottom-up" virtualization events.

A "top-down" virtualization event is one in which the determination of which host receives control in a VM exit is performed by starting with the parent of the active guest and proceeds towards the root mode host. Top-down virtualization events may be virtualization events that originate through actions of the active guest, including the execution of virtualized instructions such as the CPUID instruction in the instruction set architecture of a processor in the Pentium® Processor Family. In one embodiment, the root mode host may be provided with the ability to bypass top-down virtualization event processing for one or more virtualization events. In such an embodiment, the virtualization event may cause a VM exit to the root mode host even though it would be handled as a top-down virtualization event with regard to all intervening VMMs.

A "bottom-up" virtualization event is one in which the determination of which host receives control in a VM exit is performed in the opposite direction, e.g., from the root mode host towards the parent of the active guest. Bottom-up virtualization events may be virtualization events that originate by actions of the underlying platform, e.g., hardware interrupts and system management interrupts. In one embodiment, processor exceptions are treated as bottom-up virtualization events. For example, the occurrence of a page fault exception during execution of an active guest would be evaluated in a bottom-up fashion. This bottom-up processing may apply to all processor exceptions or a subset thereof. Additionally, in one embodiment, a VMM has the ability to inject events (e.g., interrupts or exceptions) into its guests or otherwise induce such events. In such an embodiment, the determination of which host receives control in a VM exit may be performed by starting from above the VMM that induced the virtualization event, instead of from the root mode host.

In the embodiment of FIG. 1, processor 120 controls the operation of VMs according to data stored in virtual machine control structure ("VMCS") 132. VMCS 132 is a structure that may contain state of a guest or guests, state of VMM 140, execution control information indicating how VMM 140 is to control operation of a guest or guests, information regarding VM exits and VM entries, any other such information. Processor 120 reads information from VMCS 132 to determine the execution environment of a VM and constrain its behavior. In this embodiment, VMCS 132 is stored in memory 130. VMCS 132 may be divided into multiple structures, each corresponding to one host or one guest, where each may be considered an independent VMCS.

The "guest hierarchy" of a VMM is the stack of software installed to run within the virtualization environment or environments supported by the VMM. The present invention may be embodied in a virtualization architecture in which guest hierarchies include chains of pointers between VMCSs. These pointers are referred to as "parent pointers" when pointing from the VMCS of a child to the VMCS of a parent, and as "child pointers" when pointing from the VMCS of a parent to the VMCS of a child.

Figure 2:
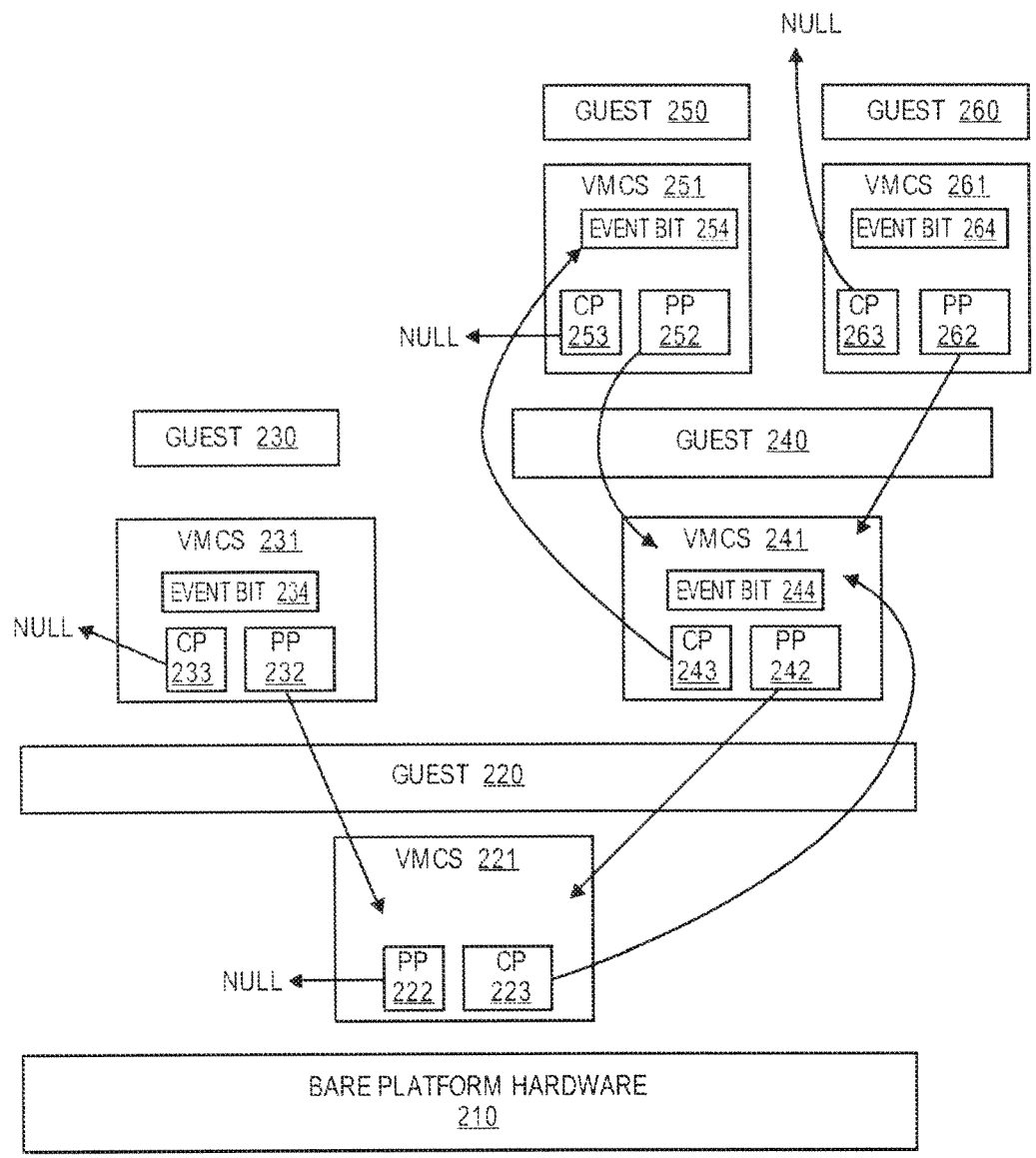
FIG. 2 illustrates the guest hierarchy of a VMM in a layered virtualization architecture.

FIG. 2 illustrates the guest hierarchy of VMM 220, which is installed as a root mode host on bare platform hardware 210. VMCS 221 is a control structure for VMM 220, although a root mode host may operate without a control structure. Guest 230 is a child of VMM 220, controlled by VMCS 231. Therefore, parent pointer ("PP") 232 points to VMCS 221. Guest 240 is also a child of VMM 220, controlled by VMCS 241. Therefore, parent pointer 242 also points to VMCS 221.

Guest 240 is itself a VMM, with two children, guests 250 and 260, each with a VMCS, 251 and 262, respectively. Both parent pointer 252 and parent pointer 262 point to VMCS 241.

The VMCS of a guest that is active, or running, is pointed to by the child pointer of its parent's VMCS. Therefore, FIG. 2 shows child pointer 243 pointing to VMCS 251 to indicate that guest 250 is active. Similarly, the VMCS of a guest with an active child pointer, as opposed to a null child pointer, is pointed to by the child pointer of its parent's VMCS. Therefore, FIG. 2 shows child pointer 223 pointing to VMCS 241. Consequently, a chain of parent pointers links the VMCS of an active guest through the VMCSs of any intervening monitors to the VMCS of a root mode host, and a chain of child pointers links the VMCS of a root mode host through the VMCSs of any intervening monitors to the VMCS of an active guest.

The VMCS 221 is referred to herein as the "root VMCS". In an embodiment, there is no root VMCS, as described above. In an embodiment which includes a root VMCS, the processing hardware may maintain a pointer to the root VMCS in an internal register or other data structure. The VMCS of a guest that is active, as described above, is referred to herein as the current controlling VMCS. For example, while guest 250 is active, VMCS 251 is the current controlling VMCS. In an embodiment, the processing hardware may maintain a pointer to the current controlling VMCS in an internal register or other data structure.

If a VMCS is not a parent VMCS, its child pointer, such as child pointers 233, 253, and 263, may be a null pointer. If a VMCS does not have a parent, for example, if it is a root-mode VMCS, its parent pointer, such as parent pointer 222, may be a null pointer. Alternatively, these pointers may be omitted. In some embodiments, the "null" value for a null VMCS pointer may be zero. In other embodiments, other values may be interpreted as "null". For example, in one embodiment with 32-bit addresses, the value 0xffffffff may be interpreted as null.

Each guest's VMCS in FIG. 2 includes a bit, a field, or another data structure (an "event bit") to indicate whether that guest's parent wants control if a particular virtualization event occurs. Each VMCS may include any number of such bits to correspond to any number of virtualization events. FIG. 2 shows event bits 264, 254, 244, and 234.

Returning to FIG. 1, processor 120 includes control logic 121 to support virtualization, including virtualization event processing in a layered virtualization architecture. Control logic 121 may be implemented in microcode, programmable logic, hard-coded logic, or any other form of control logic within processor 120. In other embodiments, control logic 121 may be implemented in any form of hardware, software, or firmware, such as a processor abstraction layer, within a processor or within any device accessible or medium readable by a processor, such as memory 130.

Control logic 121 includes event logic 122, evaluation logic 123, and exit logic 124. Event logic 122 may be divided into top-down event logic 125 and bottom-up event logic 126. Evaluation logic 123 may be divided into top-down evaluation logic 127 and bottom-up evaluation logic 128. Control logic 121 causes processor 120 to execute method embodiments of the present invention, such as the method embodiments illustrated in FIGS. 3 and 4, for example, by causing processor 120 to include the execution of one or more micro-operations, e.g., to support virtualization, in its response to virtualization instructions, other instructions from a host or guest, or virtualization events.

Figure 3:
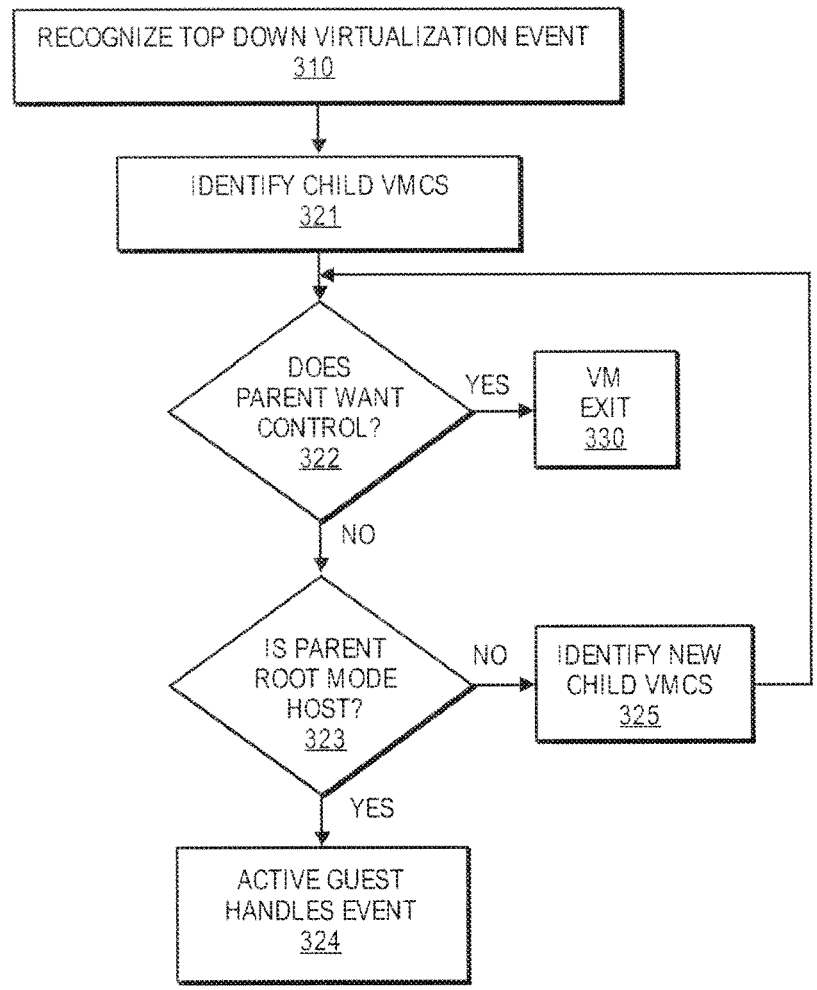
FIG. 3 illustrates a method for processing top-down virtualization events according to an embodiment of the present invention.

FIG. 3 illustrates a method for processing top-down virtualization events according to an embodiment of the present invention. In Figure box 310, top-down event logic 125 recognizes a top-down virtualization event. For example, a guest may execute a CPUID instruction, and the top-down event logic may be a decoder that decodes the instruction.

In boxes 321 to 325, top-down evaluation logic 127 determines if a VM exit is to occur in response to the top-down virtualization event, and if so, which host is to receive control. For example, top-down evaluation logic 127 may be microcode within the processor's microcode for the CPUID instruction.

In box 321, the VMCS of the active guest is identified as the child VMCS. In box 322, a determination is made as to whether the parent of that child wants control, for example, by checking the child VMCS to determine if the event bit for a CPUID instruction virtualization event is set. If it does, then, in box 330, exit logic 124 causes a VM exit to occur and control is transferred to that parent. For example, if there is a VM exit after only one pass through box 322, then the parent of the active guest receives control.

If the determination in box 322 is that the parent does not want control, then, in box 323, a determination is made as to whether that parent is the root mode host, for example, by determining if the parent pointer of the parent VMCS is a null pointer. If it is, then no VM exit occurs and, in box 324, the active guest handles the virtualization event itself e.g., by allowing the CPUID instruction to execute normally. If the determination in box 323 is that the parent is not the root mode host, then, in box 325, the parent pointer of the child VMCS is followed to identify the parent VMCS as the new child VMCS, replacing the last child VMCS. Then, box 322 is repeated.

The following pseudo code also illustrates a method for processing top-down virtualization events according to an embodiment of the present invention. In the embodiment depicted in this pseudo code, a root VMCS is present.

```
Detect virtualization event "<<event>>"
if (controlling-VMCS != root-VMCS) {
    // The root-VMM is not currently active.
    // Walk through all ancestors of the currently operating VM,
    // starting with the nearest relative (the parent VMM), checking
    // each until one is found that wants control when <<event>>
    occurs.
    // Start with the current controlling-VMCS
    walk = controlling-VMCS;
    do {
        // Check if this VMM wants to gain control on this event
        if (controls in walk indicate a VM exit is required due to
        <<event>>) {
            // This VMM level wants a VM-exit on this event. Generate the
            // VM-exit, using information from the walk VMCS and storing
            // guest state in the walk VMCS.
            VM-exit(walk);
        }
        // Follow the parent pointer chain to go to the next older VMM
        walk = walk->parent-VMCS;
    } while (walk != root-VMCS);
}
// Either (1) the root VMM is currently operating, or (2) no VMM
// wants control on this event. The currently
// operating SW handles the event itself (i.e, allow the
// instruction to execute normally).
...
```

Figure 4:
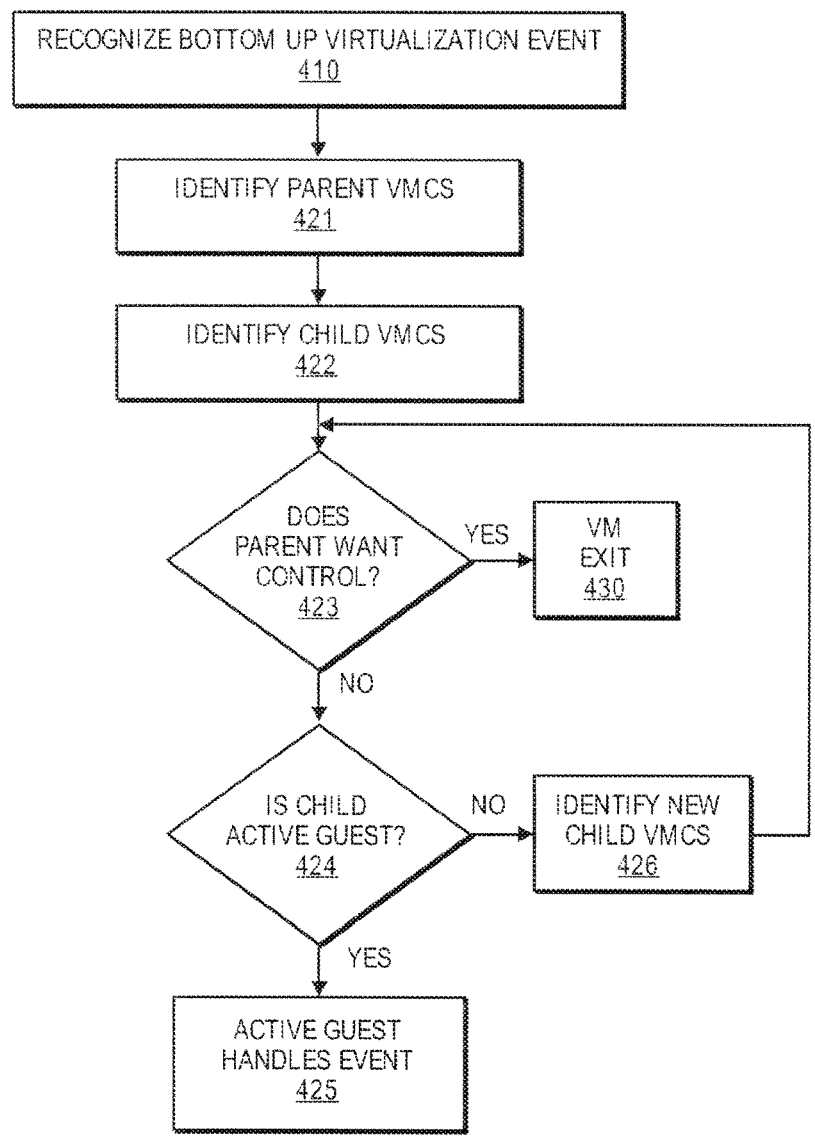
FIG. 4 illustrates a method for processing bottom up virtualization events according to an embodiment of the present invention.

FIG. 4 illustrates a method for processing top-down virtualization events according to an embodiment of the present invention. In box 410, bottom-up event logic 126 recognizes a bottom-up virtualization event. In boxes 421 to 425, bottom-up evaluation logic 128 determines if a VM exit is to occur in response to the bottom-up virtualization event, and if so, which host is to receive control.

In box 421, the VMCS of the host associated with the bottom-up virtualization event is identified as the parent VMCS. For example, if the bottom-up virtualization event is an interrupt generated by hardware, the root mode host may be identified as the parent. Alternatively, if the bottom-up virtualization event (e.g., an exception, interrupt or other virtualization event) is induced or injected by a host, that host may be identified as the parent.

In box 422, the child pointer of the parent VMCS is followed to identify the child VMCS. In box 423, a determination is made as to whether the parent wants control, for example, by checking the child VMCS to determine if the event bit for a particular interrupt or type of interrupt is set. If it is, then, in box 430, exit logic 124 causes a VM exit to occur and control is transferred to that parent. For example, if the root mode host is identified as the parent in box 421, and there is a VM exit after only one pass through box 423, then the root mode host receives control.

If the determination in box 423 is that the parent does not want control, then, in box 424, a determination is made as to whether the child is the active guest, for example, by determining if the child pointer of the child VMCS is a null pointer. If it is, then no VM exit occurs and, in box 425, the active guest handles the virtualization event itself. If the determination in box 424 is that the child is not the active guest, then, in box 426, the child VMCS is identified as the new parent VMCS, replacing the last parent VMCS. Then, box 422 is repeated.

The following pseudo code also illustrates a method for processing bottom-up virtualization events according to an embodiment of the present invention. In the embodiment depicted in this pseudo code, a root VMCS is present.

```
Detect bottom-up virtualization event "<<event>>"
if (controlling-VMCSpp != root-VMCS) {
  // The root-VMM is not currently active.
  // Walk through all VMMs which are ancestors of the currently
  // operating VM, starting at the VMCS pointed to by the child
  pointer of the root-VMCS,
  // checking each until one is found that wants control when
  // <<event>> occurs.
  // Start with the lowest controlling VMCS above the root-VMCS.
  // walk is initialized to the root-VMCS and it will be bumped at
  the
  // top of the while loop, below.
  //
  // Stop searching after we have checked the current controlling
  VMCS.
  walk = root-VMCS;
  do {
    // Go to the next younger VMM (i.e., closer to the currently
    // operating guest). Note that the root-VMM's
    // controlling VMCS is NOT checked.
    walk = walk->child-VMCS;
    // Check if this VMM wants to gain control on this event
    if (walk indicates VM exit required for <<event>>) {
      // This VMM level wants a VM-exit on this event.
      VM-exit(walk);
    }
  } while (walk != current controlling-VMCS);
}
// Either (1) the root-VMM is running or (2) no VMM wants
control on this event.
// The currently-operating SW must handle it itself
. . .
```

Within the scope of the present invention, the methods illustrated in FIGS. 3 and 4 may be performed in different orders, performed with illustrated boxes omitted, performed with additional boxes added, or performed with a combination of reordered, omitted, or additional boxes. For example, the methods of FIGS. 3 and 4 may be combined with an additional box to determine whether a recognized virtualization event is a top-down or a bottom-up virtualization event. For another example, in box 430 of FIG. 4, a VM exit may not occur if the event is a hardware interrupt and a control bit indicates that the hardware interrupt is blocked, in which case the active guest may continue to execute while the hardware interrupt is held pending.

Some portions of the above descriptions have been presented in terms of algorithms and symbolic representations of operations on data bits within a computer system's registers or memory. These algorithmic descriptions and representations are the means used by those skilled in the data processing arts to effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It may have proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is to be appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

Furthermore, processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally, or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses and methods for processing virtualization events in a layered virtualization architecture have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
 a hardware processor including event circuit to recognize a virtualization event, and evaluation circuit to determine whether to transfer control of the apparatus from a child guest to a parent guest in response to the virtualization event, wherein the child guest and parent guest each include a bit per virtualization event to indicate whether the parent guest is to gain control when the virtualization event occurs.

2. The apparatus of claim 1, wherein the evaluation circuit is also to determine whether to transfer control from the child guest to a host of the parent guest when the evaluation circuit determines not to transfer control from the child guest to the parent guest.

3. The apparatus of claim 1, wherein the evaluation circuit is also to determine whether to transfer control from the child guest to a root mode host when the evaluation circuit determines not to transfer control from the child guest to the parent guest.

4. The apparatus of claim 1, wherein the evaluation circuit is also to determine whether to transfer control from the child guest to a host of the parent guest before determining whether to transfer control from the child guest to the parent guest.

5. The apparatus of claim 1, wherein the evaluation circuit is also to determine whether to transfer control from the child guest to a root mode host before determining whether to transfer control from the child guest to the parent guest.

6. The apparatus of claim 1, wherein the parent guest is a virtual machine monitor.

7. An apparatus comprising:
 a hardware processor including
  first event circuit to recognize a first virtualization event;
  second event circuit to recognize a second virtualization event;
  first evaluation circuit to determine whether to transfer control of the apparatus from a child guest to a parent guest in response to the first virtualization event; and
  second evaluation circuit to determine whether to transfer control of the apparatus from the child guest to a host of the parent guest in response to the second virtualization event, wherein the child and parent guest each include a bit per virtualization event to indicate whether the parent guest is to gain control when the virtualization event occurs.

8. The apparatus of claim 7, wherein:
the first evaluation circuit is also to determine whether to transfer control from the child guest to a host of the parent guest when the first evaluation circuit determines not to transfer control from the child guest to the parent guest; and
the second evaluation circuit is also to determine whether to transfer control from the child guest to the parent guest if the second evaluation circuit determines not to transfer control from the child guest to the host of the parent guest.

* * * * *